US010295823B2

(12) United States Patent
Yu et al.

(10) Patent No.: US 10,295,823 B2
(45) Date of Patent: May 21, 2019

(54) SYSTEMS AND METHODS FOR ELICITING CUTANEOUS SENSATIONS USING ELECTROMAGNETIC RADIATION

(71) Applicant: PINE DEVELOPMENT CORPORATION, Mountain View, CA (US)

(72) Inventors: William J. Yu, Mountain View, CA (US); Alexander A. Brownell, Bountiful, UT (US)

(73) Assignee: Pine Development Corporation, Mountain View, CA (US)

( * ) Notice: Subject to any disclaimer, the term of this patent is extended or adjusted under 35 U.S.C. 154(b) by 701 days.

(21) Appl. No.: 14/896,896

(22) PCT Filed: Jul. 2, 2014

(86) PCT No.: PCT/US2014/045327
§ 371 (c)(1),
(2) Date: Dec. 8, 2015

(87) PCT Pub. No.: WO2015/003103
PCT Pub. Date: Jan. 8, 2015

(65) Prior Publication Data
US 2016/0154237 A1 Jun. 2, 2016

Related U.S. Application Data

(60) Provisional application No. 61/842,175, filed on Jul. 2, 2013, provisional application No. 61/887,861, filed on (Continued)

(51) Int. Cl.
G06F 3/01 (2006.01)
G08B 6/00 (2006.01)
(Continued)

(52) U.S. Cl.
CPC ..... *G02B 27/0093* (2013.01); *G02B 26/0816* (2013.01); *G02B 27/0025* (2013.01);
(Continued)

(58) Field of Classification Search
CPC ............ G02B 27/0093; G02B 26/0816; G02B 27/0025; G02B 27/09; G02B 27/40; G06F 3/016; G08B 6/00
(Continued)

(56) References Cited

U.S. PATENT DOCUMENTS 4,795,224 A 1/1989 Goto
6,038,595 A 3/2000 Ortony
(Continued)

FOREIGN PATENT DOCUMENTS

WO WO2011052131 5/2011

OTHER PUBLICATIONS

Cayce, Infrared Neural Stimulation of Thalamocortical Brain Slices, IEEE Journal of Selected Topics in Quantum Electronics, vol. 16, No. 3, May/Jun. 2010, 8pgs.
(Continued)

*Primary Examiner* — Daryl C Pope
(74) *Attorney, Agent, or Firm* — Phillips Ryther & Winchester; Jared L. Cherry

(57) ABSTRACT

The present disclosure pertains to various embodiments of optical stimulation systems that may be configured to generate a stimulation beam capable of inducing a cutaneous sensation in a user. A position tracking system associated with the stimulation system may be configured to track a position of at least one target stimulation area. A controller may be configured to generate a control signal to selectively activate the stimulation system and to receive the position of at least one target stimulation area from the position tracking system. A beam steering system may be configured to
(Continued)

receive input from the controller and configured to direct the stimulation beam toward the at least one target stimulation area based on the input from the controller.

20 Claims, 7 Drawing Sheets

Related U.S. Application Data on Oct. 7, 2013, provisional application No. 61/900,924, filed on Nov. 6, 2013.

(51) Int. Cl.
  *G02B 26/08* (2006.01)
  *G02B 27/00* (2006.01)
  *G02B 27/09* (2006.01)
  *G02B 27/40* (2006.01)

(52) U.S. Cl.
  CPC .............. *G02B 27/09* (2013.01); *G02B 27/40* (2013.01); *G06F 3/016* (2013.01); *G08B 6/00* (2013.01)

(58) Field of Classification Search
  USPC .......................................... 340/407.1, 573.1
  See application file for complete search history.

(56) References Cited

U.S. PATENT DOCUMENTS

| | | | |
|---|---|---|---|
| 6,115,482 A | 9/2000 | Sears et al. | |
| 6,165,170 A * | 12/2000 | Wynne ................. | A61B 18/203 606/10 |
| 6,921,413 B2 | 7/2005 | Mahadevan-Jansen et al. | |
| 7,488,341 B2 | 2/2009 | Merfeld | |
| 7,736,382 B2 | 6/2010 | Webb et al. | |
| 7,833,257 B2 | 11/2010 | Walsh, Jr. et al. | |
| 7,883,535 B2 | 2/2011 | Cantin et al. | |
| 7,883,536 B1 | 2/2011 | Bendett et al. | |
| 7,951,181 B2 | 5/2011 | Mahadevan-Jansen et al. | |
| 7,988,688 B2 | 8/2011 | Webb et al. | |
| 7,994,468 B2 | 8/2011 | Duijve et al. | |
| 8,012,189 B1 | 9/2011 | Webb et al. | |
| 8,160,696 B2 | 4/2012 | Bendett et al. | |
| 8,330,729 B2 | 12/2012 | Tachi et al. | |
| 8,456,448 B2 | 6/2013 | Rekimoto | |
| 8,562,658 B2 | 10/2013 | Shoham et al. | |
| 8,574,280 B2 | 11/2013 | Yu et al. | |
| 2002/0002391 A1 | 1/2002 | Gerdes | |
| 2006/0154216 A1 | 7/2006 | Hafez et al. | |
| 2007/0060984 A1 | 3/2007 | Webb et al. | |
| 2007/0179534 A1 | 8/2007 | Firlik et al. | |
| 2007/0285402 A1 | 12/2007 | Lim et al. | |
| 2008/0077200 A1 | 3/2008 | Bendett et al. | |
| 2009/0069871 A1 | 3/2009 | Mahadevan-Jansen et al. | |
| 2009/0209896 A1 | 8/2009 | Selevan | |
| 2009/0278798 A1 | 11/2009 | Kim et al. | |
| 2010/0152794 A1 | 6/2010 | Radivojevic et al. | |
| 2010/0262212 A1 | 10/2010 | Shoham et al. | |
| 2010/0277696 A1 | 11/2010 | Huebner | |
| 2010/0280580 A1 * | 11/2010 | Hosokawa ........... | A61N 5/0619 607/89 |
| 2010/0292758 A1 | 11/2010 | Lee et al. | |
| 2011/0021272 A1 | 1/2011 | Grant et al. | |
| 2011/0133910 A1 | 6/2011 | Alarcon | |
| 2011/0238141 A1 | 9/2011 | Webb et al. | |
| 2011/0295331 A1 | 12/2011 | Wells et al. | |
| 2012/0068952 A1 | 3/2012 | Slaby et al. | |
| 2012/0147911 A1 | 6/2012 | Dantus et al. | |
| 2012/0179228 A1 | 7/2012 | DeCharms | |
| 2012/0229400 A1 | 9/2012 | Birnbaum et al. | |
| 2012/0229401 A1 | 9/2012 | Birnbaum et al. | |
| 2012/0302821 A1 | 11/2012 | Burnett | |
| 2013/0013331 A1 | 1/2013 | Horseman | |

OTHER PUBLICATIONS

Dittami, Intracellular calcium transients evoked by pulsed infrared radiation in neonatal cardiomyocytes, Journal of Physiology 589.6 (2011) pp. 1295-1306, 12 pgs.
Jindra, Epidermal laser stimulation of action potential in the frog sciatic nerve, Journal of Biomedical Optics 15(1), 015002-1-15002-6, Jan./Feb. 2010, 6pgs.
Kajimoto, Tactile Feeling Display using Functional Electrical Stimulation, Graduate School of Engineering, The University of Tokyo, ICAT 1999, Tokyo, Japan, 8pgs.
Lee, Virtual Surface Characteristics of a Tactile Display Using Magneto-Rheological Fluids, Open Access, Sensors 2011, ISSN 1424-8220, 12pgs.
L'Etang, The effect of Laser Wavelength in the Simulation of Laser Generated Surface Waves in Human Skin Model, Proceedings of the 28th IEEE, EMBS Annual International conference, NY, USA, Aug. 30-Sep. 3, 2006, 4pgs.
Rajguru, Infrared photostimulation of the crista ampullaris, Journal of Physiology 589.6 (2011) pp. 1283-1294, 12pgs.
Richter, Neural stimulation with optical radiation, Laser & Photonics Reviews 5, No. 1, 60-80, 2011, 13pgs.
Stockbridge, Focusing through dynamic scattering media, Optics Express 15087, vol. 20, No. 14, Jul. 2, 2012, 7 pgs.
Vellekoop, Phase control algorithms for focusing light through turbid media, Optics Communications 281 3071-3080, 2008, 10pgs.
Vellekoop, Focusing light through living tissue, Optical Coherence Tomorgraphy and Coherence Domain Optical Methods in Biomedicine XIV, 2010, 10pgs.
Wells, Application of infrared light for in vivo neural stimulation, Journal of Biomedical Optics 10(6), 064003-1-064003-12, Nov./Dec. 2005, 12pgs.
Wells, Optical Stimulation of neural tissue in vivo, Optics Letters, vol. 30, No. 5, p. 504-506, Mar. 1, 2005, 3pgs.
Wells, Optically Mediated Nerve Stimulation: Identification of Injury Thresholds, Wiley InterScience, Lasers in Surgery and Medicine 39:513-526, Jul. 23, 2007, 14pgs.
Wells, et al. Infrared nerve stimulation: Hearing by Light. BioOptics World, Nov. 1, 2008 (6pgs).
International Search Report of PCT/US2013/049141, dated Dec. 3, 2013.
Written Opinion of PCT/US2013/049141, dated Dec. 3, 2013.
Himmer, et al. Micromachined silicon nitride deformable mirrors for focus control, Optics letters, vol. 26, No. 16, Aug. 15, 2001.
Shao, 3-D Moems Mirror for Laser Beam Pointing and Focus Control, IEEE Journal of Selected Topics in Quantum Electronics, vol. 10, No. 3, May/Jun. 2004.
International Search Report of PCT/US2014/045327, dated Nov. 21, 2014.
Written Opinion of PCT/US2014/045327, dated Nov. 21, 2014.
Hoshi, Development of Aerial-Input and Aerial-Tactile-Feedback System. IEEE World Haptics Conference 2011, 978/1/4577-0297-6/11 pp. 569-573.
Iwamoto, et al., Two-Dimensional Scanning Tactile Display using Ultrasound Radiation Pressure. IEEE Symposium on Haptic Interfaces for Virtual Environment and Teleoperator Systems 2006.
Yoshino, et al. Visio-Acoustic Screen for Contactless touch Interface with Tactile Sensation. IEEE World Haptics Conference 2013.

* cited by examiner

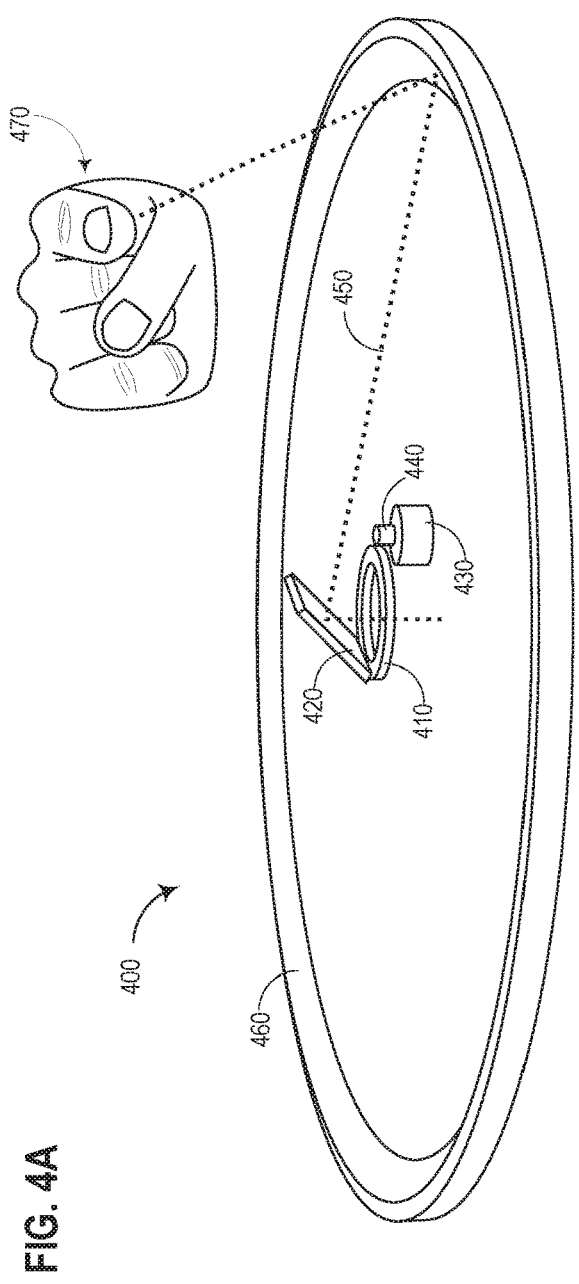
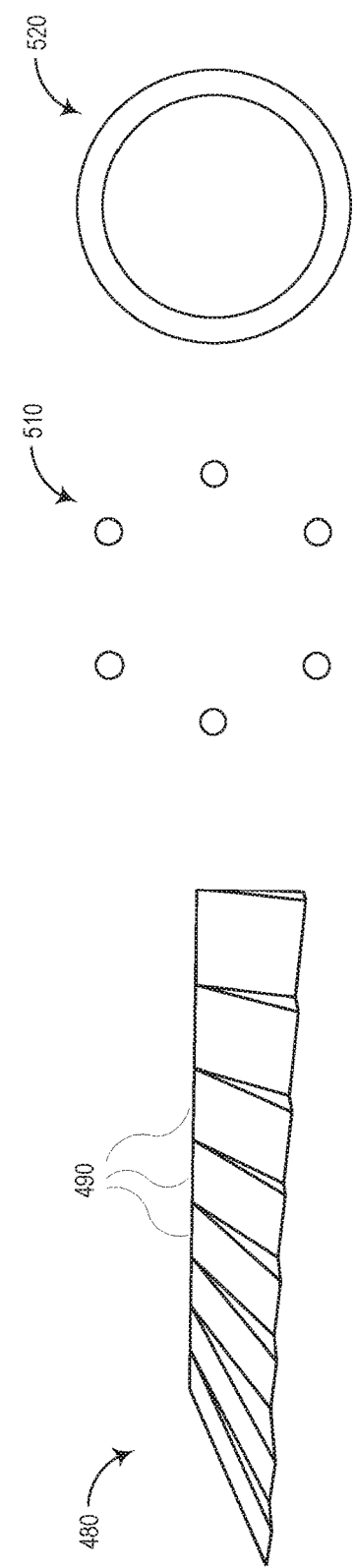
FIG. 4A
FIG. 4B
FIG. 5

SYSTEMS AND METHODS FOR ELICITING CUTANEOUS SENSATIONS USING ELECTROMAGNETIC RADIATION

RELATED APPLICATIONS

The present application claims the benefit of Patent Cooperation Treaty No. PCT/US2014/045324, filed Jul. 2, 2014, and titled "SYSTEMS AND METHODS FOR ELICITING CUTANEOUS SENSATIONS BY ELECTROMAGNETIC RADIATION," which claims the benefit of U.S. Provisional Patent Application No. 61/842,175, filed Jul. 2, 2013, and titled "NON-CONTACT INTERFACE"; U.S. Provisional Patent Application 61/887,861, filed Oct. 7, 2013, and titled "NON-CONTACT INTERFACE"; and U.S. Provisional Patent Application No. 61/900,924, filed Nov. 6, 2013, and titled "APPLICATIONS OF SYSTEMS AND METHODS FOR ELICITING CUTANEOUS SENSATIONS BY ELECTROMAGNETIC RADIATION," each of which is incorporated herein by reference in their entireties.

TECHNICAL FIELD

The present disclosure is directed to systems and methods using electromagnetic radiation to induce cutaneous sensations by directly or indirectly exciting neural tissue.

BRIEF SUMMARY

The present disclosure pertains to various embodiments of optical stimulation systems that may be configured to generate a stimulation beam capable of inducing a cutaneous sensation in a user. A position tracking system associated with the stimulation system may be configured to track a position of one or more target stimulation areas. A controller may be configured to generate a control signal to selectively activate the stimulation system and to receive the position of the target stimulation area from the position tracking system. The position tracking system may also provide the controller speed and acceleration data to assist in beam steering, adjusting stimulation parameters, and anticipating the next position of the targeted tissue. A beam steering system configured to receive input from the controller and configured to direct the stimulation beam toward the target stimulation area based on the input from the controller.

In one embodiment the beam steering system may include a first steering element configured to translate the stimulation beam in a first direction and a second steering element configured to translate the stimulation beam in a second direction that is perpendicular to the first direction.

A focusing system may be configured to adjust a focal distance or a spot size of the stimulation beam. The focal distance or the spot size may be varied based upon the position of the target stimulation area as detected by the position tracking system. The first steering element and the second steering element may be controlled using a first galvanometer and a second galvanometer, respectively. The first galvanometer and the second galvanometer may be controlled by the control system.

In some embodiments, the beam steering system may partially or completely surround the target stimulation area. For example, the beam steering system may be a ring having a plurality of reflective elements disposed around the perimeter of the ring. In other embodiments, the beam steering system may include a rotatable mirror configured to rotate to position based on the position of the target stimulation area. The rotatable mirror may be configured to direct the stimulation beam within a plane. An annular reflector disposed around the rotatable mirror in the plane and may be configured to reflect the stimulation beam out of the plane and toward the target stimulation area. The annular reflector may include a plurality of reflectors disposed at a plurality of angles with respect to the plane.

The stimulation system may include a light source configured to generate the stimulation beam. A first lens may be configured to collimate the stimulation beam and a second lens may be configured to at least partially compensate for the effects of chromatic aberration. The first and second lenses may be separated by a variable distance. A focusing system may be configured to focus the stimulation beam based on position of the target stimulation area by adjusting the distance between the first lens and the second lens.

The present disclosure contemplates use of a wide variety of stimulation patterns. In one embodiment, the controller is configured to deliver a plurality of punctate stimuli to a plurality of points in a moving pattern. The moving pattern may include a first frame and a second frame. The second frame may include an addition at least one point in the pattern that is absent from the first frame. Further, the moving pattern may include a plurality of common stimulation points in the first frame and the second frame.

In some embodiments, the stimulation system may be associated with a companion device configured for use in connection with a main viewing device. The companion device may be a computing device, a mobile telephone, a tablet, a game console, and the like. In other embodiments, the stimulation system may be configured to be used independently, and may be embodied in a television, a computing device, a mobile telephone, a tablet, a game console, and the like.

Some embodiments consistent with the present disclosure may include a thermal feedback system configured to measure a temperature associated with the target stimulation area. The controller may be configured to dynamically control the stimulation system to maintain the temperature below a threshold temperature. A variety of types of sensors may provide inputs to the thermal feedback system. In one embodiment, an infrared thermocouple may be used to measure the temperature associated with the target stimulation area. In other embodiments, the sensor may be one of a thermographic imager, a pyrometer, and a thermopile.

BRIEF DESCRIPTION OF THE DRAWINGS

Non-limiting and non-exhaustive embodiments of the disclosure are described herein, including various embodiments of the disclosure illustrated in the figures listed below.

FIG. 4A illustrates a non-contact light induced cutaneous sensation system consistent with embodiments of the present disclosure.

FIG. 4B illustrates an enlarged view of a portion of the outer annular reflector of the system illustrated in FIG. 4A.

FIG. 5 illustrates both a punctate stimulation pattern and a continuous stimulation pattern consistent with embodiments of the present disclosure.

FIG. 6A illustrates a series of points of stimulation that follow one another through a defined path each time the array of points moves to a new position the second point occupies the point previously occupied by the first, the third occupies the space of the second and so on.

Figure 1:
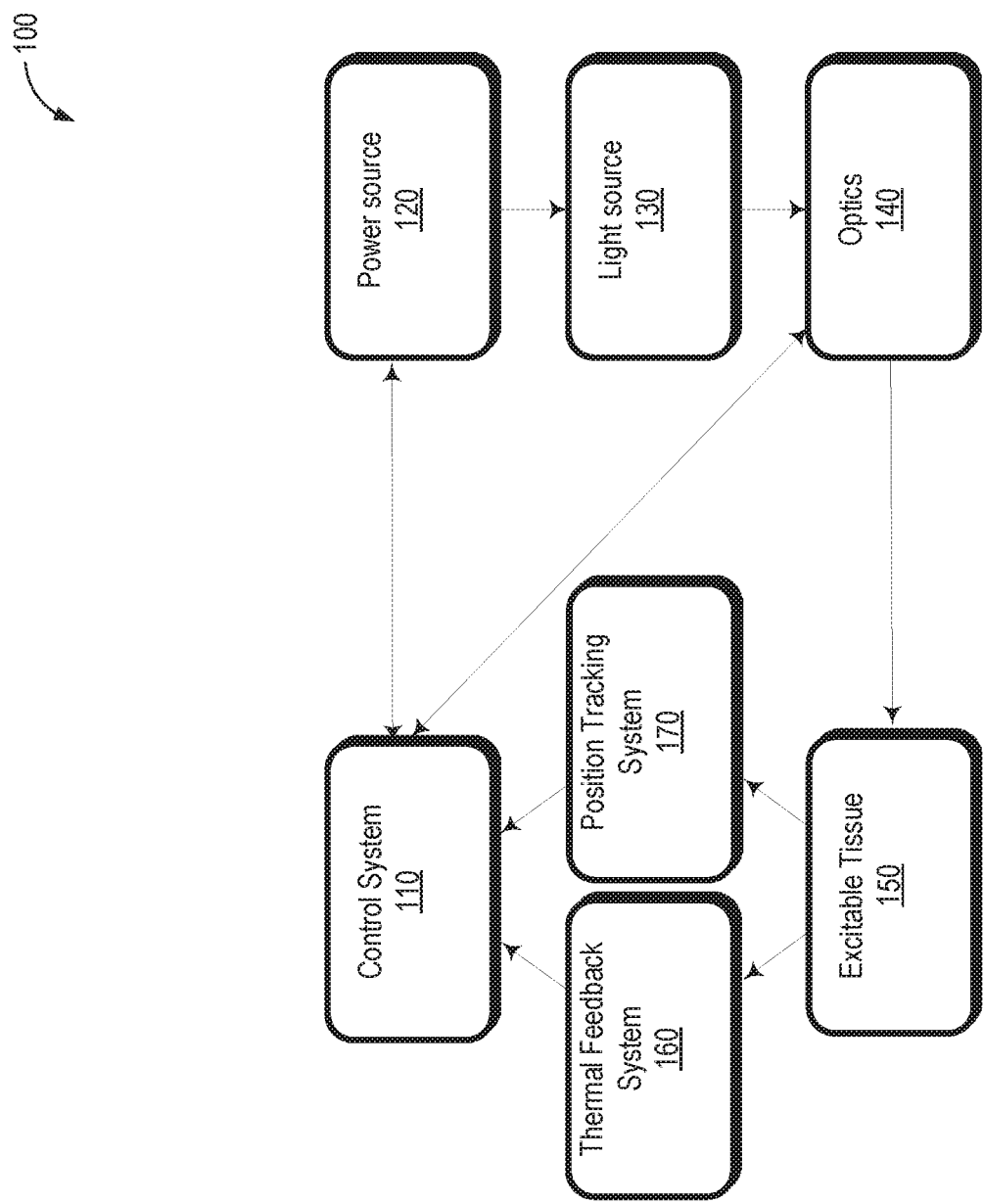
FIG. 1 illustrates a functional block diagram of a non-contact light induced cutaneous sensation system consistent with embodiments of the present disclosure.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

According to various embodiments a non-contact cutaneous stimulation system may comprise an electromagnetic source to generate an optical stimulation beam and a beam steering system configured to direct the beam onto tissues to elicit neural activity. A non-contact cutaneous stimulation system may include, but is not limited to, an electromagnetic source, a device to detect tissue within a prescribed usage area, a tissue temperature sensor, a controller module, a power source, and optics to deliver the radiation to the tissue.

Cutaneous sensations can be elicited by illumination with certain wavelengths of electromagnetic radiation in the infrared and/or visible spectrum. Such infrared light is focused onto and/or through the surface of the skin to mimic the sensation of physical touch. This can be done in free space with no physical contact with any object, only the light incident on the tissue.

A non-contact cutaneous stimulation system may be implemented to detect the position of the tissue to be stimulated in space. Such a detection system may determine when an appropriate stimulation area (e.g., a finger), is within a designated physical space and where within that space the tissue is located. This information may be provided to a controller that generates a stimulation signal delivered to the tissue. The tissue detection and delivery system may be sufficiently accurate and responsive to selectively illuminate the stimulation area while avoiding inadvertent stimulation of non-targeted stimulation areas or other objects.

The electromagnetic source may comprise any number of technologies such that it outputs light in an appropriate wavelength, power, and other parameters, to elicit desired sensation. Focusing and delivering this light is the purpose of the various components of the optics system. A variety of approaches may be used to appropriately direct the light to the target stimulation area. Any number and type of lenses and mirrors may be employed in a manner to focus the light on the tissue such that a desired sensation is produced. Another purpose of the optics may be to avoid the unintentional illumination of anything other than the target stimulation area. Adaptive optics may be employed to dynamically change the focal length of the optical beam to achieve optimal focus only at the target stimulation area. Adaptive focusing may in one embodiment be useful when the target tissue is moving within the working volume of the stimulation system. In another embodiment, adaptive focusing can be used for fixed tissue location but where changes in spot size is desired.

According to various embodiments, light energy (e.g., a portion of the electromagnetic spectrum) may be directed onto the skin to induce cutaneous sensations. This system, in its various embodiments, may induce cutaneous sensation without direct physical contact with any mechanical or electrical portion of the device.

In the present disclosure, the terms electromagnetic radiation or light refer to the full electromagnetic spectrum; and, the term illumination is used to describe the incidence of such electromagnetic energy onto an object. In some embodiments of a stimulation system consistent with the present disclosure, the light used to induce cutaneous sensations may be in the infrared region of the spectrum. In other embodiments, the light used may be in the visible region of the spectrum. In some embodiments, the light delivered may be of a relatively narrow bandwidth within the spectrum, while in others a wider bandwidth may be utilized. Any light source may be utilized such as it provides the appropriate wavelength for stimulation of sensation.

The sensation elicited by a non-contact cutaneous stimulation system consistent with the present disclosure may be used for any number of applications, including, but not limited to the following examples. Sensations may represent: a real object somewhere distant from the user or a virtual object that may or may not be displayed to the user. Further, sensations may be used to convey: gross features of an object; fine details of an object; textual information, which may be delivered silently or in connection with other visual or auditory cues; and/or other information.

A system may utilize a controller designed to control operation of a stimulation system in a manner determined by a specific stimulation pattern. Such a controller may receive inputs from any number and type of sensor(s) and use this information to determine appropriate parameters of the stimulation system to illuminate the tissue and induce the desired sensation. Such sensors include, but are not limited to, a temperature sensor, thermographic imager, infrared sensor, motion sensor, depth cameras, and CCD camera. Motion sensors, imagers and IR sensors can be used to detect body movements and provide speed, acceleration and surface tissue contour information that the controller can use to determine the appropriate stimulation parameters to deliver. In some embodiments, a controller may be designed to operate in the same way for all users, while in other embodiments, the controller may be capable of performing a user specific calibration and adapting its output for a specific user.

In some embodiments, a non-contact cutaneous stimulation system may utilize an infrared imaging device or other imaging device to detect the location of one or more target stimulation areas within a defined volume of space wherein the system is capable of delivering stimulation to the tissue. Such a device may be capable of detecting multiple target stimulation areas simultaneously. The information from this imaging device may be fed to the controller, which in turn feeds appropriate commands to the power source, light source, and the optics, and/or beam steering system to focus the light onto only the target stimulation area in such a way to elicit a desired sensation.

In some embodiments, an infrared temperature probe or other temperature sensing technology, such as, but not limited to, a thermographic imager or camera, pyrometer, thermopile, and/or thermocouple may be used to determine the target stimulation area surface temperature. This information may be fed to the controller and used to appropriately modulate the output of the stimulation.

The system may contain any number of components for the purpose of directing and focusing the light onto the tissue. The sum of these components is referred to as the optics. Optics components may be any number and type of lenses, mirrors, prisms, active or passive filters or any other type of technology meant to manipulate light in some way. The beam or beams may be manipulated in any number of ways, including but not limited to, diverging and converging, splitting, attenuating, and multiplying. The manipulation of the light is directed to the purpose of delivering the appropriate light energy to the tissue to elicit the desired sensation.

The stimulation beam may be dynamically adaptable to appropriately focus the light energy on the target stimulation area in various embodiments because the tissue may be located at various distances from the optical source. A combination of movable lenses, mirrors, prisms, fiber optics or other optical devices may be used to dynamically change the focus of the system. Other optical manipulators including but not limited to spatial light modulator (SLM) devices may also be used to dynamically adapt the beam for focus as well as wavefront manipulation to optimize tissue penetration.

In one embodiment, the system may consist of a device that may be positioned on a desk or tabletop and may track and stimulate the tissues in a defined space above the device. In another embodiment, the unit may be a larger device with the tracking and stimulation space contained within a portion of the device. For example, the user may insert a hand or other tissue to be stimulated into a box or a tube. In one embodiment, the light source may be placed distant to the light emitting location, in which case the light may be directed from this source to the spot of emission by fiber optics, mirrors, lenses, or by other optical means.

In some embodiments, there may be a plurality of light sources and/or a plurality of light emitting locations, while in other embodiments a single light source may be directed to multiple light emission ports in the device via fiber optics or reflectors. The ability to emit a plurality of stimulation beams from multiple locations may allow for the stimulation of multiple tissue surfaces. Additionally, this may allow for the use of multiple sub-threshold beams to converge on a single area of tissue to create a supra-threshold stimulus. A multitude of emitters or reflectors may be arranged in many configurations such as, but not limited to, a linear array to one side of the tissue, an inward facing ring around the tissue, or an inward facing dome around the tissue.

In some embodiments, the free-space cutaneous sensation apparatus can be coupled with a display separate from the stimulation space. In such embodiments, the movement of the finger or other tissue and the data resulting from the tracking technology can be fed to the system and used to interact with the objects or other images on the display. In other embodiments, the sensation apparatus may not be associated with a video-based display.

In certain embodiments, the light source configured to generate a stimulation beam may comprise a laser diode. In such embodiments, the divergence of the light may differ in the fast and slow axis. Capturing, formatting, and focusing this light may be accomplished by using two or more lenses in series. In other embodiments, the light may be focused or collimated by a single lens placed directly over the diode emitter. Such lenses, known as fast axis collimation (FAC) and slow axis collimation (SAC) lenses offer the advantage of being immobile in relation to the emitter and relatively efficient because little energy is lost. A custom FAC/SAC lens placed directly onto the emitter surface may replace a series of lenses otherwise necessary to condition and format the beam in a similar manner.

Surface features of various objects or other information to be represented may be delivered by illumination of the tissue in a number of ways. In certain embodiments, the sensations may be delivered by a multitude of stimulation pulses of discrete temporal lengths and each at a single spatial location on the tissue. This plurality of points may create a punctate region of illumination, the spacing of which may be sufficiently small to elicit the sensation of a continuous shape. Alternatively, the points may be spread farther apart to create spatially distinct sensations. In embodiments in which a single light source is used, a raster or scanning pattern may be used to illuminate each of these points. In creating a surface representation, the beam may be rastered back and forth around the portion of the tissue to be stimulated. If this surface representation is to be moved relative to the tissue, the entire pattern may be rastered, scanned, or translated, to a new section of the tissue. This may be done in such a way as to minimize the movement time of the beam to maximize efficiency.

In other embodiments, the illumination of the tissue may be delivered in a way that is not punctate. The smooth movement of a point of illumination may be directed continuously or in a pulsed fashion over a portion of tissue to create the sensation of a line or curve. The beam intensity may be modulated as it is moved, or dragged, about the tissue to create different sensations.

Sensations delivered to the tissue need not represent physical or virtual objects. In some cases it may be desirable to create sensations that may not be represented by a real object. Movement or growth of a sensation may be desirable. One such example may be referred to as embossing, which may involve a sensation of the growth of a small area of sensation into a larger area of sensation while maintaining all or a portion of the previous area of sensation. This may enable the creation of uniquely recognizable sensations.

Slider controls are a common feature of many user interfaces. As such they are a simple, widely recognized and useful control mechanism. Many embodiments of a light induced cutaneous sensation system may utilize such controls. As the user's tissue is tracked in space, it may come into the space wherein a virtual slider control is defined. As the tissue enters this space, it is illuminated to create the sensation analogous to the portion of the slider control that would be touched. If the user moves that tissue in the same direction that would move a slider control, a control system may cause the sensation to remain in the same relative location on the tissue and notes the change as the new virtual spatial position of the slider control. This system may be implemented in free space as well as touch surface embodiments.

Various embodiments consistent with the present disclosure are illustrated in the figures contained herein and are described below. Such components may be combined in any number of configurations to create a fully functional system embodiment. However, the figures and the descriptions thereof are not intended to limit the scope of the disclosure but are representative of embodiments possible by combination of any of the various components disclosed.

FIG. 1 illustrates a functional block diagram of a non-contact light induced cutaneous sensation system 100 consistent with embodiments of the present disclosure. Excitable tissue 150 may be placed within a predetermined tracking space, in which position information of the tissue may be determined by a position tracking system 170. In some embodiments, the position tracking system 170 may be configured to determine speed and acceleration of a target stimulation area. The position tracking system 170 may be configured to estimate the trajectory of the target stimulation area to increase the responsiveness of the system to a user's movement. In some embodiments, the speed and acceleration of the target stimulation area can alter the stimulation parameters and/or the positioning of the stimulation beam. The position tracking system 170 may further be configured to determine a tissue contour and an angle of incidence at which the stimulation beam may strike the target stimulation area. The stimulation parameters of the simulation beam may be adjusted to account for variations caused by reflection, spot size, and the like that are attributable to the angle of incidence. This information along with, in some embodiments, thermal information from a thermal feedback system 160 is delivered to a control system 110. The thermal feedback system 160 may include, but is not limited to, a thermographic imager or camera, pyrometer, or similar non-contact measurement sensor to measure surface tissue temperature.

When a stimulus is desired, a command may be sent from a control system 110 to a power source 120 that supplies power to the light source 130. The light source 130 may create a desired pulse of optical energy or a continuous beam of light output. This light may then be focused, modulated, and/or manipulated in other ways by optics 140 to illuminate the excitable tissue 150 of the user and to induce a desired cutaneous sensation. With certain types of illumination the temperature of illuminated tissue may change due to the illumination. The increase in temperature may vary depending on the particular wavelength of light used to illuminate the tissue.

In some embodiments, the thermal feedback system 160 may detect a change in temperature and may send the data regarding the temperature change to the control system 110. In some embodiments, the control system 110 may utilize information regarding the temperature of the tissue to make appropriate adjustments to the subsequent stimuli. Such adjustments may include, but are not limited to, reducing the intensity of the illumination to maintain the temperature of the tissue within a predetermined range, adjusting the intensity of the illumination to reduce energy consumption after a sensation threshold has been reached, etc.

In some embodiments, the excitable tissue 150 may be allowed to move freely within the predetermined tracking space. Communication delays between the various components of system 100 may be minimized to ensure delivery of the light energy to the tissue at the desired location in spite of movement of the tissue. The power source 120 and optics 140 may have feedback mechanisms to return information to the controller so that safety protocols may be used to ensure proper and safe functioning of these systems. In an example of such an embodiment, when the desired tissue is no longer in the predetermined tracking space, the control system 110 may cut power to the light source 130.

In some embodiments, the functions of the thermal feedback system 160 and position tracking system 170 may be combined into a single device. An example of such an embodiment may be the use of an infrared imager, or camera, with an autofocus feature. The volume of space for use in this embodiment may be limited to the field of view of this imager, or may be further restricted. Image recognition may be used, or other identifying features may be used to track the x and y coordinates of the tissue in the image created by the imager. The information about position in the z axis may be obtained from the autofocus feedback built into the image as well as from the relative or absolute size of the tissue on the image.

In some embodiments the position tracking system 170 may be a dual sensor system, where the sensors are placed at a distance from one another and the differential measurements allow for localization in three dimensions. In various embodiments such position determination sensors may be, but are not limited to, CCD detectors, CMOS detectors, and LIDAR. In the embodiment with LIDAR, the laser source may be the same source as that used for the stimulation or it may also be separate.

Figure 2:
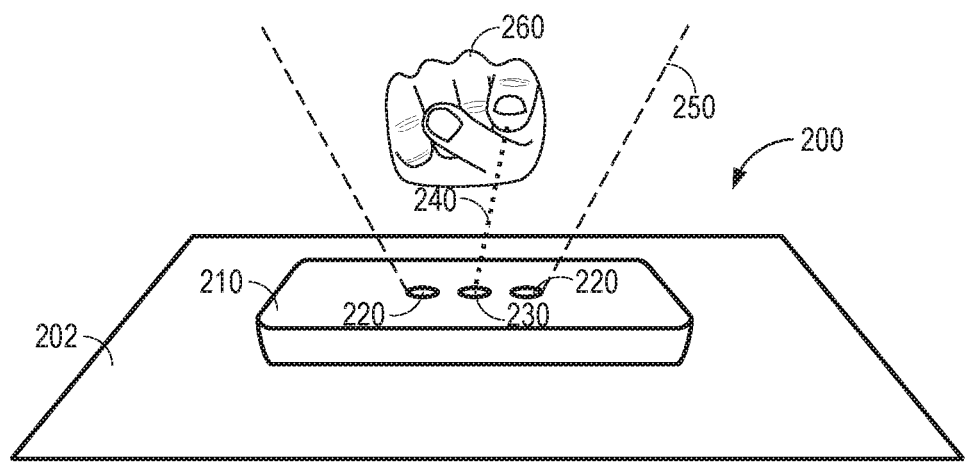
FIG. 2 shows a self-contained desktop embodiment of a non-contact light induced cutaneous sensation system consistent with embodiments of the present disclosure.

FIG. 2 shows a self-contained desktop embodiment of a non-contact light induced cutaneous sensation system 200 consistent with embodiments of the present disclosure. In the illustrated embodiment, system 200 may be configured to lie on a flat surface 202 and detect the presence of target stimulation area 260 within a space above the apparatus. In this embodiment, the housing 210 of the device may enclose a controller, the power source, light source, and optics, which are not separately illustrated. A pair of detectors 220 may determine a location in space as well as tissue temperature of the target stimulation area 260. The detectors, may include, but are not limited to, infrared CCD detectors, pyrometers, CMOS detectors, and LIDAR. The boundary of the volume of space in which the tissue may be detected and stimulated is shown by dashed lines 250. The boundary may be limited by considerations of the field of view and accuracy of the detectors 220 within the field as well as the capability of the light source and optics. The boundary may be limited further due to design and utility considerations.

In the illustrated embodiment, a stimulation beam 240 may be directed toward an outstretched index finger within the volume of space. The location of the fingertip along with the temperature thereof is given to the controller, which in turn may send commands to the power and light sources to deliver the proper amount of illumination to induce a sensation. The stimulation beam 240 is emitted from an emitter surface 230 and directed onto the target stimulation area 260. Underlying the emitter surface 230 may include an optical scanner capable of directing the light in the x and y direction. Various embodiments for directing the light in the x and y direction are described in greater detail below.

In the specific embodiment illustrated in FIG. 2, all components of the system are enclosed in a single housing

210. Other embodiments may utilize different housings that contain more or fewer components of a stimulation system. Power may come from an internal source, such as batteries, or an external source (not shown). The controller may reside in a separate device and data may be exchanged with the detectors 220 and emitter surface 230 through a wireless or wired connection (now shown).

In certain embodiments, data may be exchanged with another device including, but not limited to a computer, tablet, or phone. Such a data link may provide the ability to use these devices as a visual display for correlates of the objects, surfaces or other information conveyed to the user by the cutaneous sensation system. Such computers may also interface with a stimulation system controller.

In a separate embodiment, the various components of this device may be integrated into a mobile computing device. The sensors and the light emitters may be placed to the periphery of a display and work in the same manner previously described for the tabletop solution. In a separate embodiment, the system may be attached or connected in some way to such a mobile device.

The system shown in FIG. 2 may use a pair of detectors 220 for both location and temperature determination. In other embodiments, any number of detectors may be used. Sensors need not be both location and temperature sensors. These may be separate in various embodiments. The number and placement of such sensors may be varied according to considerations of accuracy, precision, efficiency, and design of the device.

The illustrated embodiment includes a single emitter surface 230. In other embodiments the device may utilize a plurality of light sources. Some embodiments may use a single light source but direct that light through any number of emitting surfaces. This may be done for the purpose of greater coverage of the volume with illumination, or increased flexibility of illumination from various angles. As shown in FIG. 2, the stimulation beam 240 may emanate from only one emitter 230; however, other embodiments may have multiple stimulation beams from angles through a plurality of light sources. Further, advanced beam manipulations may generate a plurality of stimulation beams from a single source.

Figure 3:
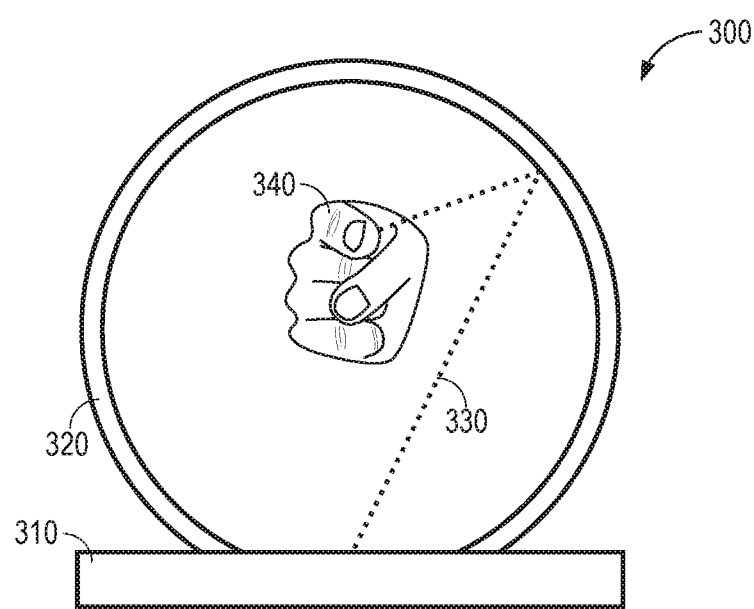
FIG. 3 shows an embodiment of a non-contact light induced cutaneous sensation system that partially surrounds a target stimulation area consistent with embodiments of the present disclosure.

FIG. 3 shows an embodiment of a non-contact light induced cutaneous sensation system 300 that partially surrounds the target stimulation area consistent with embodiments of the present disclosure. In the illustrated embodiment, a tube or ring 320 houses various optical components and sensors. The system 300 sits on a base 310 that may house a controller, a power source, a light source, optics, and/or sensors. Alternatively, optics, sensors, and other components may be disposed around the ring 320.

Tissue 340 to be stimulated is illuminated by a stimulation beam 330. In the illustrated embodiment, the stimulation beam 330 originates in the base 310 and is reflected off the ring 320 before encountering the tissue 340. In some embodiments, multiple light sources may be used to generate multiple stimulation beams. Such light sources may be disposed around the ring and may provide the ability to stimulate a plurality of points.

A series of stationary or moveable mirrors (not shown) may be disposed around the inner perimeter of the ring 320 to direct the beam 330. Such reflectors may also be used to manipulate the beam in various ways. For example, such manipulation may include focusing or disbursing the beam to achieve a desired level of sensation.

In the illustrated embodiment, one or more sensors associated with a position tracking system (not shown) may be placed around the periphery of the ring 320 or within the base 310. There may be a single location sensor or a plurality of sensors used to track the position of the tissue 340. Similarly, temperature sensors may be used to track the temperature of the tissue 340, and information regarding the temperature may be provided to a thermal feedback system (not shown). As noted above, in some embodiments the sensors used by the position tracking system may be the same sensors used to determine the temperature of the tissue.

Housings in a wide variety of shapes and sizes are contemplated, including but not limited to semi-circles, boxes, spheres, tubes, or cages. Such enclosures may completely or partially surround the target stimulation area. Materials creating such enclosures may, according to some embodiments, be opaque or transparent to visible light.

FIG. 4A illustrates a non-contact light induced cutaneous sensation system 400 consistent with embodiments of the present disclosure. In the illustrated embodiment, a stimulation beam 450 is directed onto tissue 470 disposed above the stimulation system 400. A mirror 420 is mounted on an annular mount 410 that mates with the shaft 440 of a rotational motor 430. The mirror 420 may be rotated in a full circle and may reflect a stimulation beam 450 originating from below in an arbitrary direction within a plane. The beam 450 may pass through an aperture in the annular mount 410 before reflecting off of mirror 420. The beam may then be reflected off of an outer annular reflector 460. The annular reflector 460 may reflect the stimulation beam out of the plane in which the annular reflector is located.

FIG. 4B illustrates an enlarged view 480 of a portion of the outer annular reflector 460 consistent with embodiments of the present disclosure. In the illustrated embodiment, a plurality of reflectors 490 disposed at different angles may be repeated, and together may comprise the outer annular reflector 460. The plurality of reflectors 490 at a corresponding plurality of angles may allow for a stimulation beam at a fixed angle relative to the plane of the annulus to be reflected at a plurality of angles. Accordingly, the beam may be directed in a variety of angles. The plurality of reflectors 490 may permit considerable flexibility in directing the stimulation beam to a desired location. In some embodiments, the reflective surfaces may be flat, or may be curved in order to focus or diffuse the beam.

In another embodiment of the design shown in FIG. 4A, a plurality of stages may be utilized to increase the area that may be illuminated and/or to increase the spatial resolution of system over what may be realized using a single stage. In one example, a first stage may include a light source and a rotationally positionable mirror (similar to mirror 420). The mirror may direct the stimulation beam to a plurality of reflectors disposed below a plurality systems similar to system 400. The beam may pass from the first stage to the second stage by reflecting off of one of the plurality of reflectors located on the first stage. The rotationally positionable mirrors on the second stage may direct the stimulation beam to an associated annular reflector (similar to annular reflector 460). The same concept may be applied to any number of stages in various embodiments.

FIG. 5 illustrates both a punctate stimulation pattern 510 and a continuous stimulation pattern 520 consistent with embodiments of the present disclosure. The punctuate stimulation pattern 510 may be perceived by a user as a circle created by stimulating in discrete points around the perimeter of the desire circle. To sustain such a sensation, the same points may be stimulated repeatedly over time. In contrast, the continuous stimulation pattern 520 may be generated by continuously moving the beam around the perimeter of a circle. If the spacing between points in the punctate stimulation pattern 510 is smaller than the ability of the tissue to distinguish discrete sensations, a user may perceive a continuous line around the circle perimeter. Such ideas may be extended to the creation of any shape, not limited to the perimeter thereof either.

In some embodiments, the intensity of the beam may be modulated at various points within either a punctuate or continuous stimulation pattern to vary the perceived profile of the shape. The beam intensity may also drop to zero to leave a portion of the shape unstimulated. The stimulation may be delivered from the same source or from multiple sources. In the case of a shape large enough to cover a portion of tissue where the contour is not planar or irregular in some way, the stimulation may be modulated in intensity to compensate for the different angles of incidence. In another embodiment, a plurality of stimulation beams may be directed in such a way that the angle of incidence is equal for all points of stimulation. In another embodiment, such stimulation may be delivered through some material which allows the passage of the stimulating wavelengths and with which the target stimulation area is in contact.

Figure 6A:
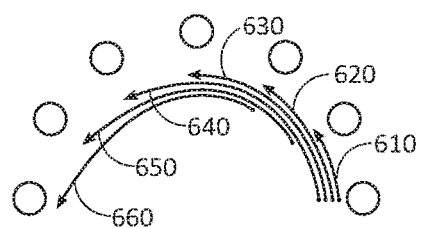

FIG. 6A illustrates a series of points of stimulation that follow one another through a defined path each time the array of points moves to a new position the second point occupies the point previously occupied by the first, the third occupies the space of the second and so on. The pattern illustrated in FIG. 6A may be referred to herein as "caterpillaring." As shown in FIG. 6A the initial points of a sensory region may be stimulated and then any number of additional points along that path may be added sequentially until the desired length of the "caterpillar" or train of stimulating points is achieved. After the desired "caterpillar" length is achieved the tracing of the intended shape continues and the initial points are dropped as points farther along the path are stimulated.

As shown in FIG. 6A, the initial point of stimulation is on the far right. This point is stimulated, then after a given amount of time the second point is added, as indicated by arrow 610. Now two points are stimulated. A third, fourth and fifth point is eventually added as indicated by arrows 620, 630 and 640 respectively. At this point the caterpillar has reached the desired length and as another point along the path is added to the stimulation the initial point is dropped as shown by arrow 650. Arrow 660 shows the progression of the caterpillar to another set of points along the path dropping the first two points of the path. In this example, the length of the caterpillar is 5 points of stimulation. Such a "caterpillar" is not limited to a specific length or number of individual points of stimulation. A train of points of stimulation may trace out any shape and at any speed. Each point of stimulation may be of similar or different stimulation energies as desired to create the effect at different times or physical locations within the shape. The example shown deals with an initial lack of any stimulation and a gradually emerging caterpillar, or growing train of stimulation points. The caterpillar may also emerge at its full length or some intermediate length immediately. The length of the caterpillar may also change dynamically along the path. Many caterpillars may be simultaneously moved around the tissue.

Figure 6B:
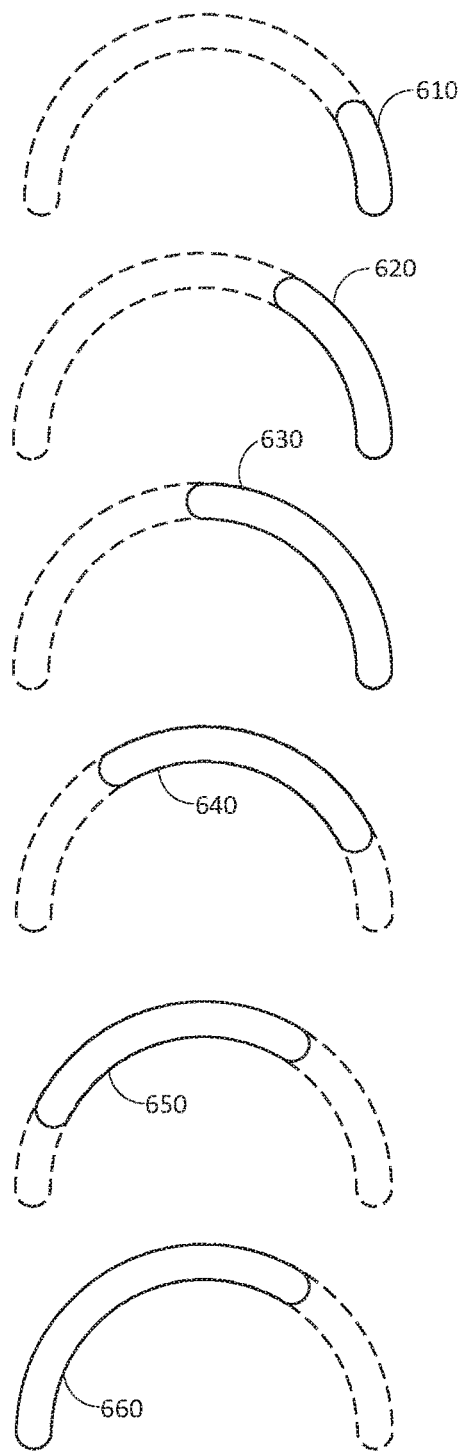
FIG. 6B illustrates a sensation that may be perceived by a user as a result of a "caterpillaring" stimulation pattern spanning six stimulation frames consistent with one embodiment.

FIG. 6B illustrates a sensation that may be perceived by a user as a result of a "caterpillaring" stimulation pattern spanning six stimulation frames consistent with one embodiment. The intensity of the leading portions of a caterpillar may be of sufficient intensity to elicit sensation alone, or they may be of lower energy and act to prime the tissue so that later portions of the caterpillar elicit sensation. As shown in comparing various frames, subsequent frames include at least one additional point in the pattern that is absent from a prior frame. Further, the temporally adjacent frames include a plurality of stimulation points that are the same.

FIG. 6B may also represent a separate embodiment in which the illumination pattern is that of a continuously directed beam onto a curved path on the tissue rather than a series of distinct points. Such application of the optical energy may be repeated at a desired frequency in similar manner to the discrete points. The continuous path is not limited to curves, but may represent any shape and is not limited to a single continuous path. The intensity of the stimulation may also vary throughout the path.

If in the stimulation program the array of points are always stimulated in the same order in a cluster at the beginning of each round of stimulation, then there may be increases in the frequency for all stimulation points except for the leading point each time the caterpillar moves to a new position. These increases in frequency may increase the intensity of the stimulation undesirably. Such considerations are applicable to stimulation systems including a single illumination source and to systems including multiple illumination sources. In the case of a system including a single source of illumination, the stimulation pulses are directed onto a target stimulation area via some method of beam steering. Each stimulation cycle may allow time at the initial site for stimulation to reach a threshold, time for the steering mechanism to redirect the beam as appropriate, and time to stimulate the next point, and so on. Each pulse may remain in its place in the stimulation cycle relative to the position of the stimulus site rather than its place in the array of sites or the frequency of stimulation at one or more points may be altered. Certain embodiments consistent with the present disclosure may utilize punctate stimuli to create sensation; however, the present disclosure is also applicable to systems in which a stimulation system utilizes a continuously moving beam.

Figure 7:
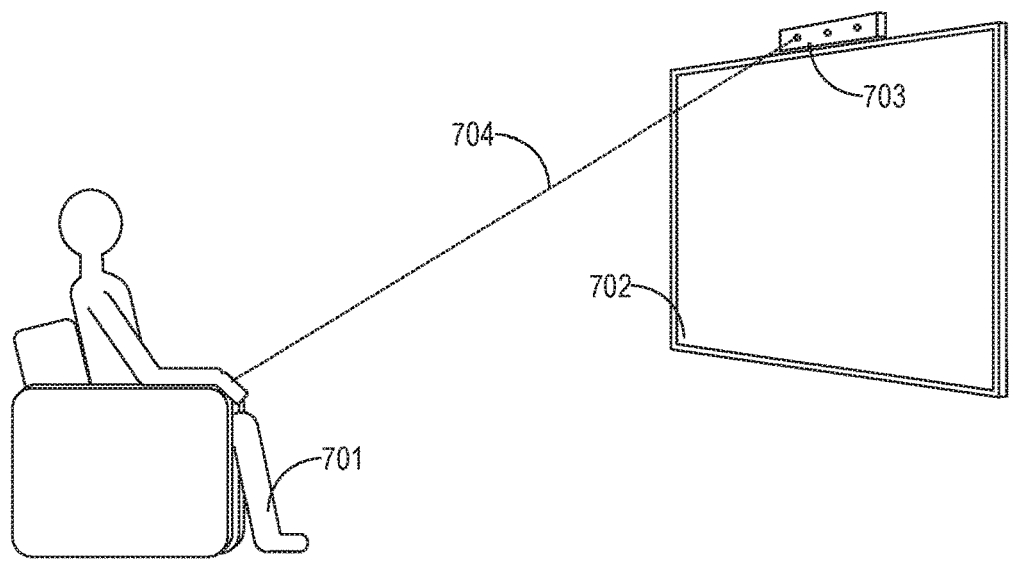
FIG. 7 shows a companion device to a main viewing screen configured to generate a stimulation beam and to direct the stimulation beam to a point of stimulation on the skin of a user consistent with embodiments of the present disclosure

FIG. 7 shows a companion device 703 to a main viewing screen 702 configured to generate a stimulation beam 704 and to direct the stimulation beam 704 to a point of stimulation on the skin of a user 701 consistent with embodiments of the present disclosure. In the illustrated embodiment, the companion device 703 is mounted above the main screen. Such an embodiment may be capable of tracking a user in space to appropriately direct the stimulating beam 704.

Second screen devices or companion devices where additional monitor(s) or supplementary device(s) are in use while watching or consuming content on a first device allows the user to interact with the programming being delivered such as a TV show, video game or movie. Such companion devices may include a non-contact light induced cutaneous sensation system configured to supplement the content displayed on the first device. In some embodiments, the companion device may be an additional monitor such as, but not limited to, a tablet or smartphone. In other embodiments the companion device may not have a display and may be close to or distant from the user such as, but not limited to, a gaming controller or webcam. In another embodiment, the companion device may not have a monitor such as, but not limited to, a controller, mouse, or touchpad. The primary or first device may be, but not limited to a TV screen, movie screen, smartphone, or tablet. In another embodiment the stimulating equipment may be incorporated into the hardware of an immersive movie theater such as an armrest, seat, or controls of an arcade game.

The programming being delivered on the first device may be synchronous or asynchronous with the companion device through the Internet, local network, or other service delivery methods such as via direct satellite transmission. The companion device allows extra data to be displayed or conveyed to the consumer to complement or supplement the content being viewed or conveyed on the first device. In this embodiment, desirable cutaneous sensation can be delivered synchronously or asynchronously with programming on the first device using tactile delivery instructions given by the controller to the electromagnetic radiation emission system residing on the companion device. The cutaneous sensation can be delivered to the finger pad(s) or any part of the body such as, but not limited to, the forearm, wrist, and palm, etc. The cutaneous sensation can be delivered in contact or non-contact mode via the electromagnetic radiation system. The companion device can be embedded in an existing multipurpose device or a standalone dedicated device.

Figure 8:
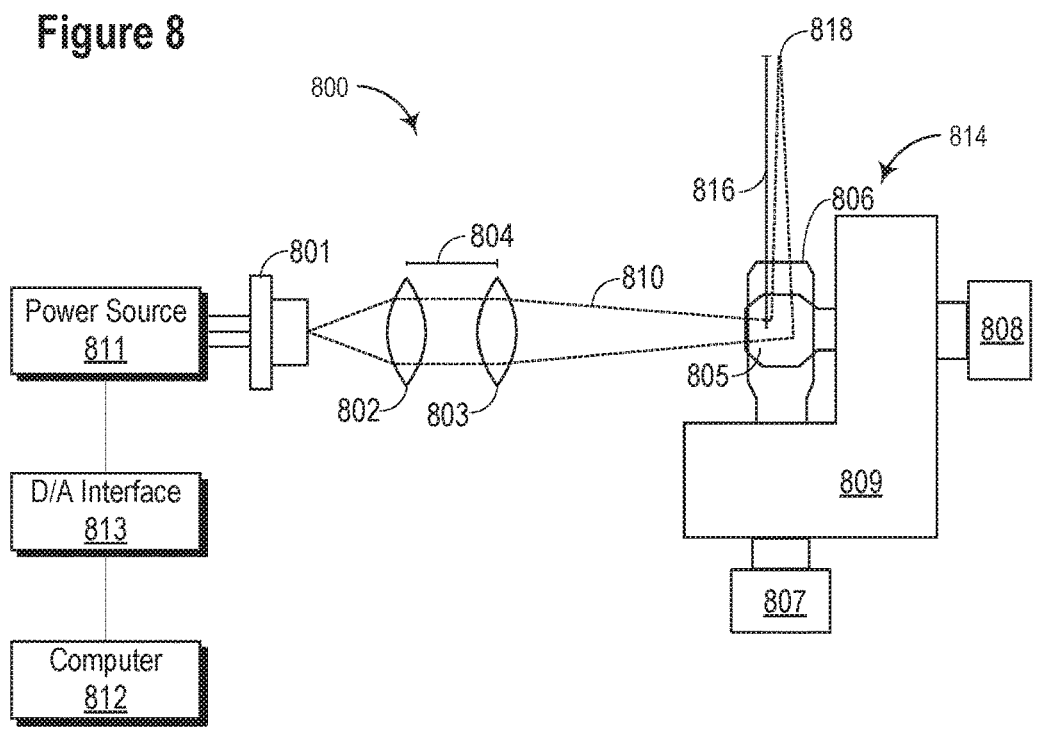
FIG. 8 illustrates a functional block diagram of a beam steering system that may be used in connection with non-contact light induced cutaneous sensation system consistent with embodiments of the present disclosure.

FIG. 8 illustrates a functional block diagram of a beam steering system 800 that may be used in connection with non-contact light induced cutaneous sensation system consistent with embodiments of the present disclosure. A stimulation beam 810 may be generated by a light source 801. In various embodiments, the light source 801 may be embodied as a multi-mode laser diode, a single-mode laser diode, or light emitting diode, or any other device capable of producing sufficiently intense light for a wavelength suitable for generating a cutaneous sensation. The light source 801 may be powered by a power source 811. In one specific embodiment, the power source 811 may be embodied as using the LaserSource 4308, available from Arroyo Instruments of San Luis Obispo, Calif.

A digital-to-analog interface 813 may be disposed between the power source 811 and a computer 812. The computer may control the power source 811 to generate a desired stimulation pattern. In alternative embodiments, the computer 812 may be replaced by an application-specific controller, which may be implemented using an application specific integrated circuit (ASIC), a field programmable gate array (FPGA), a programmable logic controller (PLC), and the like. In one specific embodiment, the D/A interface 813 may be embodied using PCI-6229 available from National Instruments Corporation of Austin, Tex.

The stimulation beam 810 may pass through lenses 802 and 803. The first lens 802 may collimate the stimulation beam 810. In other words, the first lens 802 may focus of the stimulation beam to an acceptably small spot size. The second lens 803 may reduce the effects of chromatic aberration. Although the stimulation beam 810 is illustrated as passing serially through lenses 802 and 803, in various embodiments, the lenses need not be disposed adjacent to each other in the optical path. For example, lens 803 may be positioned after a scanner 814 in the optical path of the stimulation beam.

The focal length may be changed by adjusting the distance 804 between the lenses 802 and 803. In one embodiment, a variable focal length lens can be realized, for instance, by motorizing the lenses 802 and 803. The longitudinal de-magnification effect of a telephoto lens may be used to achieve a large change in the focal length with a relatively a small shift in lens spacing because the focal plane shifts in proportion to the second power of optical magnification. In other embodiments, additional numbers and configurations of lenses may be used to dynamically adjust the focal distance and effective spot size on the tissue.

In the illustrated embodiment, a scanner 814 includes two mirrors 805 and 806 that are driven by galvanometers 807 and 808, respectively. The mirrors 805 and 806 may be mounted in bracket 809. The stimulation beam 810 may pass from lens 803 to the first mirror 805 of the scanner 814 and may be translated in the x-axis direction. The second mirror 806 may translate the stimulation beam 810 in the y-axis direction. Varying the focal length of the beam steering system 800, together with the operation of the first mirror 805 and the second mirror 806, a focal point 818 can be positioned within a 3D volume. The positioning of the focal point 818 may be limited in lateral and axial extent by the scanning range of the mirrors 805 and 806 and the adjustable focus of the lenses 802 and 803.

In one specific embodiment, the scanner may be embodied using part number GVSM002 available from Thorlabs Inc. of Newton N.J. More generically, the mirrors 805 and 806 may be referred to as steering elements that are configured to direct the stimulation beam in a particular direction. In the illustrated embodiment, use of two steering elements permits the beam steering system 800 to move steer the stimulation beam in two directions. In other embodiments, two axis beam steering may be accomplished using a single mirror and appropriate actuators and control systems.

The mirrors 805 and 806 may direct the beam at any spot within the range of optical deflection allowable for the scanner 814. In other embodiments, the scanner may be embodied by a spatial light modulator, MEMS mirror system, or any other optical scanning technology. A focal point 818 may represent the tightest focus achievable based on the positions of the lenses in the system. This is often, but not exclusively, the spot that is directed to the tissue for maximal tactile sensation induction. Intentionally adjusting the focal length short of or beyond the tissue allows for a larger illumination spot which may be useful to induce various sensations. A variety of focusing systems or focusing elements may be used to adjust a focal length 816 of the stimulation beam based upon a location of a target stimulation area. Dynamic focusing can also help in compensating for various movements and surface contours of the target tissue.

Certain advantages may be achieved over use of mirrors controlled by galvanometers may be overcome using other technologies. For example, the response time of a galvanometer controlled mirror system may be limited by the inertia of the mirrors. A possible scheme for remote optical stimulation in a 3D space that does not require the use of moving parts is holographic optical patterning. In this scheme, a collimated laser field is incident on a spatial light modulator that modulates the phase or wave front of the optical field incident on the entrance aperture of a focusing objective. The focusing objective then transforms the optical field with wave front modulation into an arbitrary intensity profile at the target according to the principle of Fourier optics. For example, beam scanning may be achieved by imparting a titled wave front to the optical field incident on the lens, which then transforms the wave front tilt into a transverse displacement at the focal plane. A shift in focal plane position can also be implemented by imparting a quadratic wave front modulation to the incident optical field. Other more complicated intensity profiles can be built up by appropriately combining different wave front shapes of the optical field using the SLM. An example of a complex illumination pattern that can be created is the generation of multiple laser spots, each focused at a different focal plane. The ability to generate multiple spots for stimulation simultaneously is advantageous as compared to sequential stimulation using scanning techniques since finite dwell time limitation can be avoided. In addition, modulating the optical phase using a SLM, unlike amplitude modulation (e.g., using a digital micromirror array where light is turn on or off on a per pixel basis), is more efficient in terms of light delivery. An additional advantage of such a scheme is that the same set up can be used to optimize beam focusing inside a highly scattering medium such as human skin. In the case of optical stimulation to induce tactile sensation, the optimal wave front can be found by letting the human subject serve as the feedback element. By dithering wave front modulation and letting the test subject select the wave front that induces the strongest tactile sensation, the optimal focusing may be approached iteratively after a number of trials.

Figure 9:
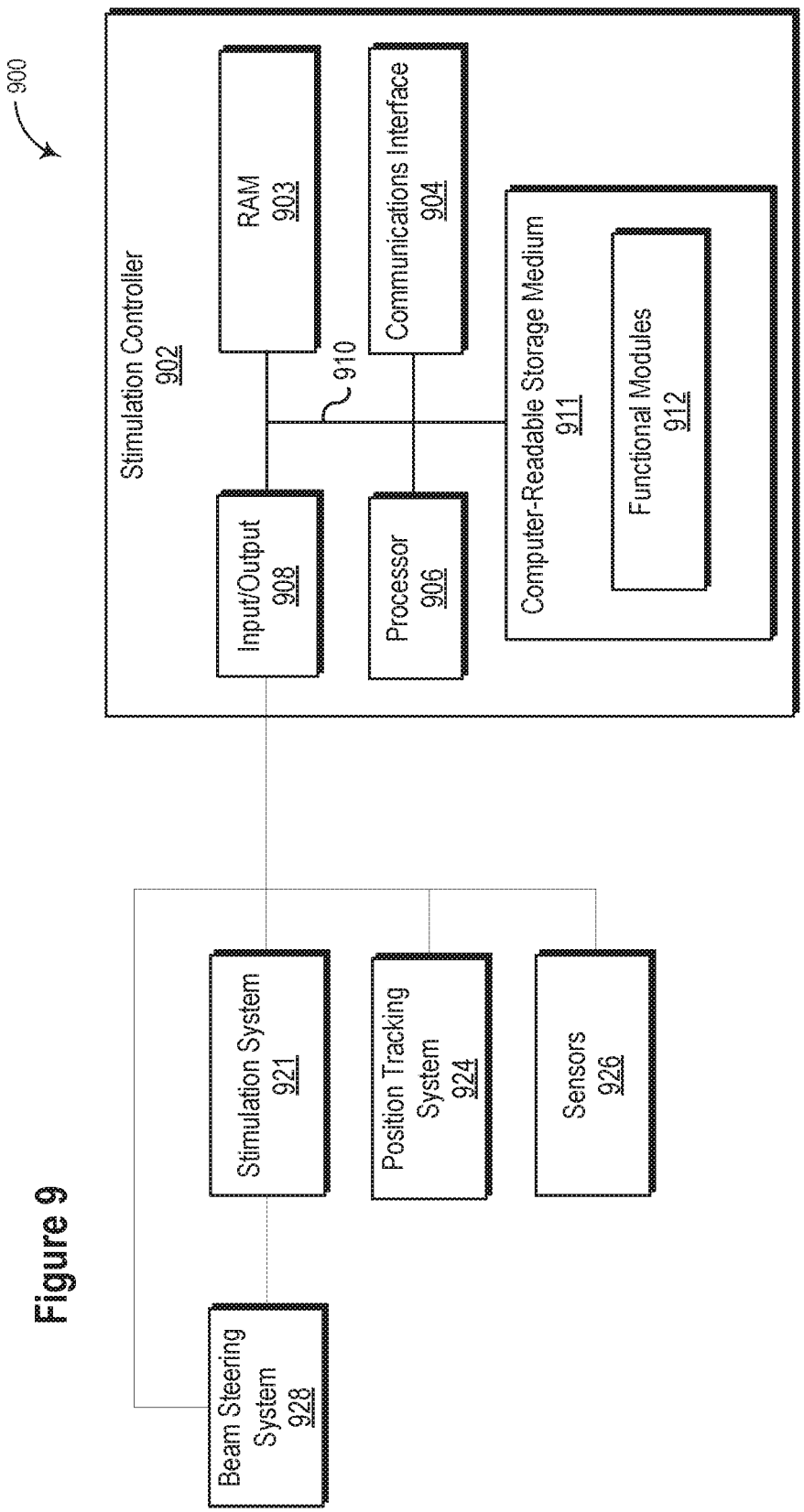
FIG. 9 illustrates a functional block diagram of a non-contact light induced cutaneous sensation system consistent with embodiments of the present disclosure.

FIG. 9 illustrates a functional block diagram of a non-contact light induced cutaneous sensation system 900 consistent with embodiments of the present disclosure consistent with embodiments of the present disclosure. A stimulation controller 902 may provide laser parameter data, including, but not limited to, amplitude, pulse width, frequency, duty cycle, and wave form, to a stimulation system 921. The stimulation controller 902 may acquire input data from a plurality of sensors 926. The plurality of sensors may detect a variety of conditions, including but not limited to surface tissue temperature, contact surface temperature, ambient temperature, calibration data, and the like. These input data may be used by the stimulation controller for determining the appropriate laser parameters. An output of the stimulation system 921 may be delivered to a beam steering system 928. According to one embodiment, beam steering system 928 may comprise any of the system illustrated and described herein, including the embodiments specifically illustrated in FIG. 2, FIG. 3, FIGS. 4A and 4B, and FIG. 8. In still other embodiments, the beam steering system 928 may comprise dynamically controlled stacked polarization gratings, MEMS-based laser scanning mirrors, digital micromirror devices, acousto-optic beam deflectors, liquid crystal spatial light modulators, and the like. Information regarding beam positioning and/or scanning speed may be collected by beam steering system 928 for use in a closed loop control system.

The output of the stimulation system 921 may be controlled by the stimulation controller 902 according to a stimulation profile. According to various embodiments, the stimulation profile may correspond to, but are not limited to, a geometric shape, a topography of a simulated object, a feedback indicator, and the like.

A position tracking system 924 may be configured to track the position of tissue being stimulated or tissue to be stimulated. Position tracking system 924 may be configured to track the position of tissue to be stimulated in free-space. In various embodiments, the position tracking system 924 may utilize various sensors or detectors, including, but are not limited to infrared CCD detectors, pyrometers, CMOS detectors, and LIDAR. The position tracking system 924 may permit the stimulation system 900 to direct the output of the stimulation system 921 to a target stimulation area.

The stimulation controller 902 may be configured to interface with a stimulation system 921, position tracking system 924, and/or sensors 926 via input/output system 908. Input/output system 908 may be embodied using a variety of technologies, including wired interfaces (e.g., Universal Serial Bus, IEEE 1394, etc.) or wireless interfaces (e.g., Bluetooth®, IEEE 802.11 wireless protocols, etc.).

The stimulation controller 902 may include a processor 906, which may be configured to execute instructions operable to implement the functionality and methods disclosed herein. Processor 906 may operate using any number of processing rates and architectures. Processor 906 may be embodied as a general purpose integrated circuit, an application specific integrated circuit, a field-programmable gate array, and/or any other suitable programmable logic device. Processor 906 may be in communication with random access memory 902 (RAM), where executable instruction may be temporarily stored.

The stimulation controller 902 may also include communications interface 904 configured to communicate with other devices. In certain embodiments, the communications interface 904 may facilitate direct communication with another device or communicate with another device or multiple devices over a communications network. According to some embodiments, communications interface 904 may be embodied as an Ethernet port.

A bus 910 may provide communication among RAM 903, communications interface 904, processor 906, input/output ports 908, and a non-volatile computer-readable storage medium 911. Computer-readable storage medium 911 may be the repository of various functional modules configured to perform any of the methods described herein. The system and methods described herein may be implemented independent of the programming language used to create computer-readable instructions and/or any operating system operating on the stimulation controller 902. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules 912 may be in the form of a collection of separate programs or modules, and/or a program module within a larger program or a portion of a program module.

Figure 10:
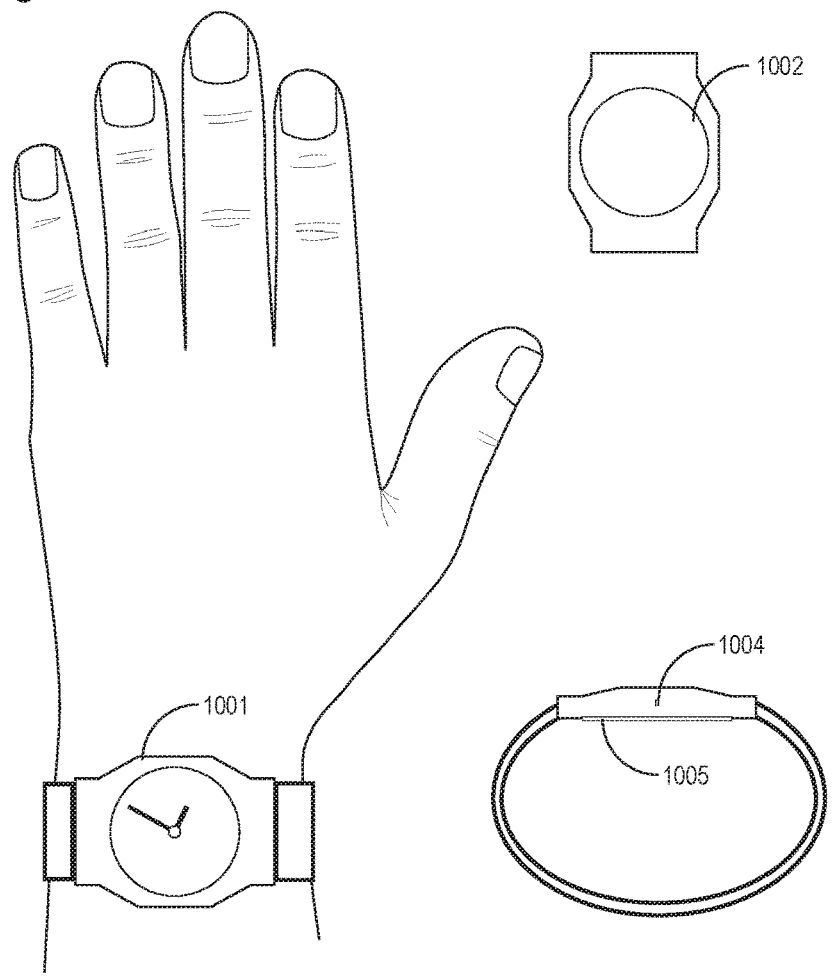
FIG. 10 illustrates a watch that may provide tactile sensation to the wrist consistent with embodiments of the present disclosure.

FIG. 10 illustrates a watch 1000 that may provide tactile sensation on the wrist consistent with embodiments of the present disclosure. The underside of the watch 1001 may include a stimulation surface or aperture 1002 through which an electromagnetic radiation source 1004 may deliver sufficient energy to elicit a desired cutaneous sensation. The electromagnetic radiation source 1004 can be, but is not limited to, a laser emission system, a LED, or a thermal radiant system. The stimulation surface 1005 can represent a contact-based application where the user's skin is directly touching the surface that is being irradiated by the electromagnetic radiation source 1004. In another embodiment, there is no direct contact with the user's skin but rather the electromagnetic radiation source 1004 is directed through an aperture to the user's skin.

Although FIG. 10 specifically illustrates a watch, other embodiments may be embodied as a wristband, bracelet, ring, necklace, ankle bracelet, or other wearable items using the systems and methods disclosed herein. A wearable device may provide certain advantages over visual and/or audio alerting and messaging in that it can deliver meaningful tactile information discreetly and solely to the wearer of the device without distracting others. Furthermore, in noisy environments, direct stimulation to the user is preferable over embodiments that rely on audible cues to communicate information. In embodiments where vibration mode is used to notify the user of important information and updates, the vibration of the device is often not felt by the user because the device resides in the pocket and not sufficiently close to the user's skin for noticeable detection. The vibration of such device can also cause distraction and annoyance to people nearby when it is placed in the open as is the case of visual and audio alerting/messaging techniques.

Figure 11:
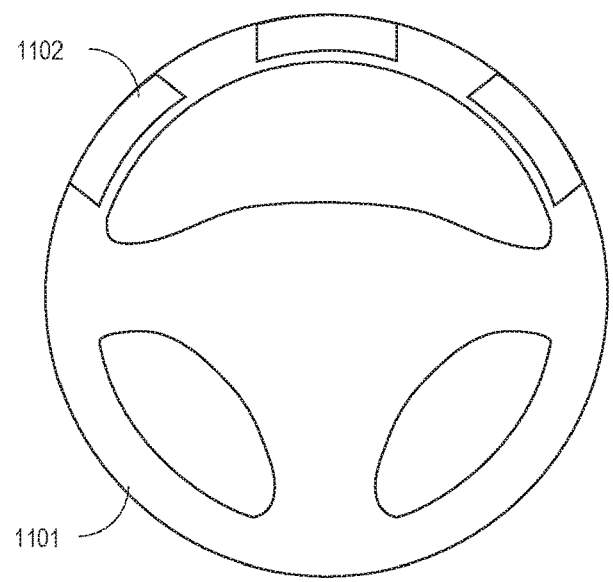
FIG. 11 illustrates placement of sensation induction areas on a steering wheel consistent with embodiments of the present disclosure.

FIG. 11 shows possible placement of sensation induction areas 1102 on a steering wheel 1101. In this embodiment, the ability to provide customized and pre-designed stimulation profiles based on spatial and temporal parameters allows for conveyance of abstract information and sensory substitution. Scalar and vector variables can be converted into a corresponding static or dynamic stimulation profile. Examples of other scalar and vector variables that can be mapped as a static or dynamic tactile signature include, but not limited to, pressure, stamina, and force. In an embodiment, where a driver is going to encounter increased traffic congestion on his current route to a destination, a gradually increasing sensation to his finger on the steering wheel can convey this information to driver, well ahead of the time he could see the congestion, without taking his eyes off the road. The placement of such stimulation areas may be any number and any position on the steering wheel. The surface of these areas may be solid material transparent to the stimulating wavelength, or they may be open or perforated to allow the stimulating beams to pass. In another embodiment, a gaming character's stamina level can be tactilely conveyed to the player's finger on a gaming controller by varying the pressure sensation delivered by an electromagnetic radiation system.

The above description provides numerous specific details for a thorough understanding of the embodiments described herein. However, those of skill in the art will recognize that one or more of the specific details may be omitted, modified, and/or replaced by a similar process or system.

What is claimed is:

1. A system configured to induce a cutaneous sensation in a user, comprising:
   a stimulation system configured to generate a stimulation beam operable to induce a cutaneous sensation;
   a position tracking system configured to track a position of at least one target stimulation area;
   a controller configured to generate a control signal to selectively activate the stimulation system and to receive the position of the at least one target stimulation area from the position tracking system; and
   a beam steering system configured to receive input from the controller and configured to direct the stimulation beam toward the at least one target stimulation area based on the input from the controller, the beam steering system comprising:
      a first steering element configured to translate the stimulation beam in a first direction;
      a second steering element configured to translate the stimulation beam in a second direction, the second direction being perpendicular to the first direction; and
      a focusing system configured to adjust a focal distance of the stimulation beam based upon the position of the at least one target stimulation area.

2. The system of claim 1, wherein the first steering element and the second steering element are rotatable using a first galvanometer and a second galvanometer, respectively, and the first galvanometer and the second galvanometer are controlled by the control system.

3. The system of claim 1, wherein the beam steering system at least partially surround the target stimulation area.

4. The system of claim 3, wherein the beam steering system comprises a ring and a plurality of reflective elements are disposed around the perimeter of the ring.

5. The system of claim 1, wherein the beam steering system comprises:
   a rotatable mirror configured to rotate to position based on the position of the at least one target stimulation area, the rotatable mirror configured to direct the stimulation beam within a plane;
   an annular reflector disposed around the rotatable mirror in the plane and configured to reflect the stimulation beam out of the plane and toward the target stimulation area.

6. The system of claim 5, wherein the annular reflector comprises a plurality of reflectors disposed at a plurality of angles with respect to the plane.

7. The system of claim 1, wherein the stimulation system further comprises:
   a light source configured to generate the stimulation beam;
   a first lens configured to collimate the stimulation beam;
   a second lens configured to at least partially compensate for reduce the effects of chromatic aberration and separate from the first lens by a distance; and
   a focusing system configured to focus the stimulation beam based on position of the at least one target stimulation area by adjusting the distance between the first lens and the second lens.

8. The system of claim 1, wherein the stimulation system is comprised within a companion device configured for use in connection with a main viewing device.

9. The system of claim 8, wherein the companion device comprises one of a computing device, a mobile telephone, a tablet, a projector, and a game console.

10. The system of claim 1, wherein the system configured to induce a cutaneous sensation in the user is embodied in one of a television, a computing device, a mobile telephone, a tablet, a projector, and a game console.

11. The system of claim 1, wherein the position tracking system further comprises a sensor selected from the group consisting of a CCD detector, a CMOS detector, and LIDAR.

12. The system of claim 1, wherein the position tracking system further comprises a sensor configured to detect at least one of a speed, an acceleration, and a surface tissue contour of the target stimulation area.

13. The system of claim 1, wherein the output of the stimulation system comprises one of infrared electromagnetic radiation and visible electromagnetic radiation.

14. A system configured to induce a cutaneous sensation in a user, comprising:
   a stimulation system configured to generate a stimulation beam operable to induce a cutaneous sensation;
   a position tracking system configured to track a position of at least one target stimulation area;
   a controller configured to generate a control signal to selectively activate the stimulation system and to receive the position of the at least one target stimulation area from the position tracking system;
   a beam steering system configured to receive input from the controller and configured to direct the stimulation beam toward the at least one target stimulation area based on the input from the controller; and
   a focusing system configured to vary a spot size of the stimulation beam at the target stimulation area based on the position of the target stimulation area.

15. A system configured to induce a cutaneous sensation in a user, comprising:
   a stimulation system configured to generate a stimulation beam operable to induce a cutaneous sensation;

a position tracking system configured to track a position of at least one target stimulation area;

a controller configured to generate a control signal to selectively activate the stimulation system and to receive the position of the at least one target stimulation area from the position tracking system; and a beam steering system configured to receive input from the controller and configured to direct the stimulation beam toward the at least one target stimulation area based on the input from the controller;

wherein the controller is further configured to deliver a plurality of punctate stimuli to a plurality of points in a moving pattern, the moving pattern comprising a first frame and a second frame, the second frame comprising an addition at least one point in the pattern that is absent from the first frame.

16. The system of claim 15, wherein the moving pattern further comprises a plurality of common stimulation points in the first frame and the second frame.

17. A system configured to induce a cutaneous sensation in a user, comprising:

a stimulation system configured to generate a stimulation beam operable to induce a cutaneous sensation;

a position tracking system configured to track a position of at least one target stimulation area;

a controller configured to generate a control signal to selectively activate the stimulation system and to receive the position of the at least one target stimulation area from the position tracking system;

a beam steering system configured to receive input from the controller and configured to direct the stimulation beam toward the at least one target stimulation area based on the input from the controller;

a thermal feedback system configured to measure a temperature associated with the at least one target stimulation area; and wherein the controller is configured to dynamically control the stimulation system to maintain the temperature below a threshold temperature.

18. The system of claim 17, wherein the thermal feedback system comprises a sensor configured to monitor at least one parameter associated with the target stimulation area.

19. The system of claim 18, wherein the sensor comprises one of a thermographic imager, a pyrometer, and a thermopile.

20. The system of claim 17, wherein the thermal feedback system further comprises an infrared thermocouple and the thermal feedback system measures the temperature associated with the at least one target stimulation area with the infrared thermocouple.

* * * * *